Aug. 26, 1941.  N. E. WAHLBERG  2,253,592
MOTOR MOUNTING
Filed Feb. 5, 1940  2 Sheets-Sheet 1
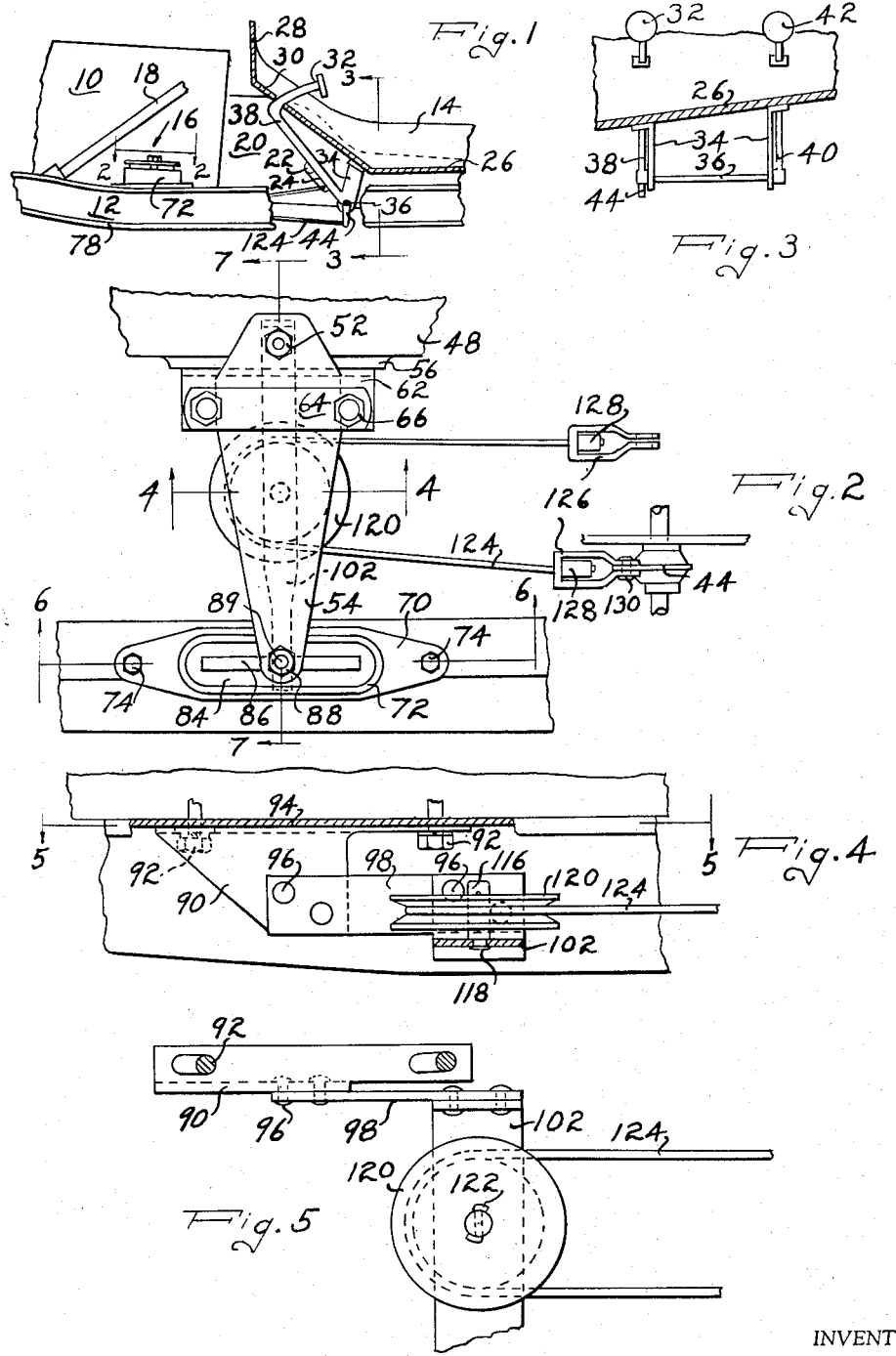
INVENTOR.
NILS ERIK WAHLBERG.
BY Carl J. Barbee
ATTORNEY.

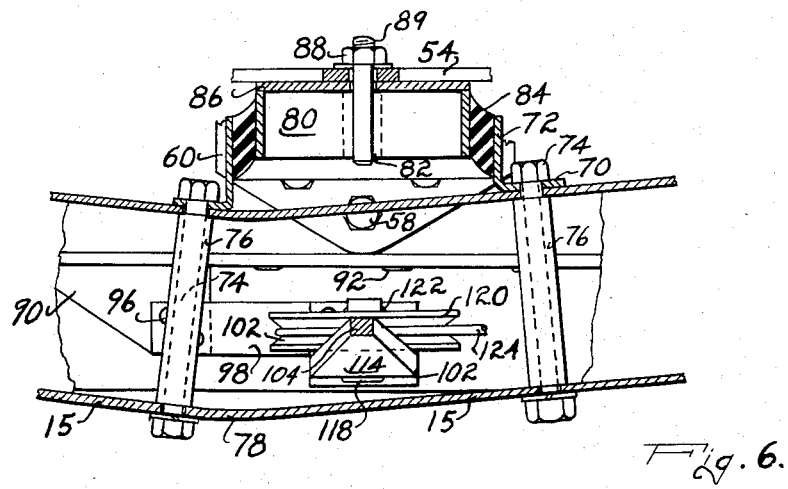
Fig. 6.
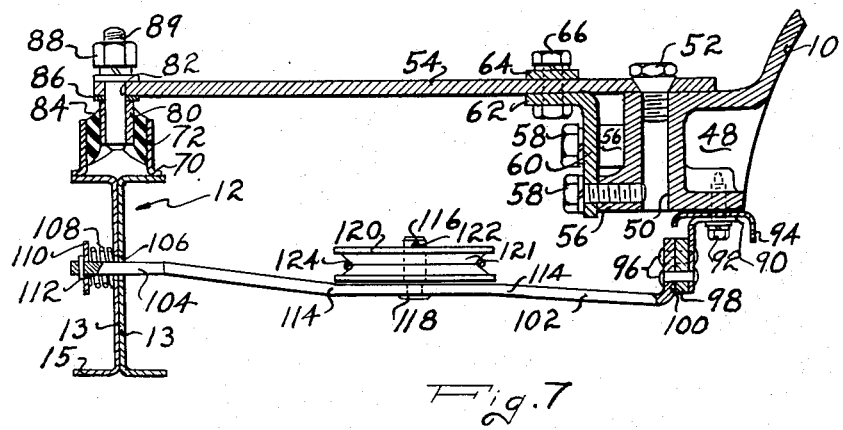
Fig. 7
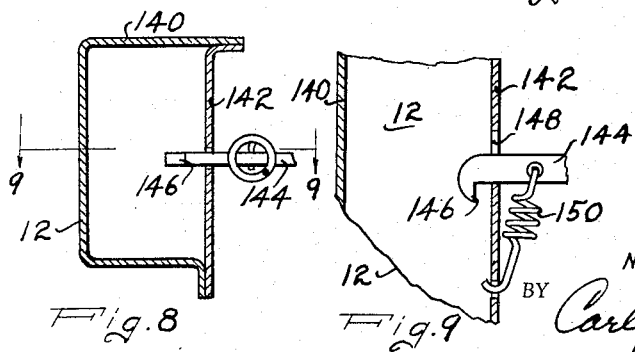
Fig. 8
Fig. 9
INVENTOR.
NILS ERIK WAHLERG.
BY Carl J. Barbee
ATTORNEY.

Patented Aug. 26, 1941

2,253,592

UNITED STATES PATENT OFFICE 2,253,592

MOTOR MOUNTING

Nils Erik Wahlberg, Kenosha, Wis., assignor to Nash-Kelvinator Corporation, Kenosha, Wis., a corporation of Maryland Application February 5, 1940, Serial No. 317,372

10 Claims. (Cl. 180—64)

This invention relates to automotive construction and has particular reference to the means for mounting the motor on the car frame together with the associated controls by which the motor is operated from within the automobile.

The common method of mounting an automobile motor rigidly to the frame allowed a simple system of levers to be used to connect such controls as the clutch pedal with the clutch operating mechanism of the motor. With the present trend in automotive design to mount the motor flexibly upon the frame in order to avoid transmission of vibration to the car body, it is necessary to provide some connection between the control in the body with the mechanism on the motor, which connection will not rattle or transmit vibration to the car body and which at the same time will give constant and positive control with the part desired. In this invention I have developed a means for flexibly mounting the motor and combined this motor mount with a control arrangement for operating the clutch from the clutch pedal within the car body. The control may, however, be arranged to be used for other control functions such as brake or transmission operating mechanisms.

In developing this mechanism it is an object to provide a flexible motor mount with a control arrangement which will leave the controlled part in one position relative to the motor in any position which the flexibly mounted motor may take relative to the frame.

It is another object of this invention to provide a control arrangement in which the control lever will be maintained in the same position relative to the automobile frame regardless of the position which the motor may take relative to the frame.

It is another object of this invention to provide a control between the body and the motor which will not transmit vibrations from the motor to the body.

It is another object of this invention to provide a flexible mounting for a motor by means of which the motor may take various positions relative to the car frame without transmitting vibrations to the frame.

It is another object of this invention to provide a control arrangement in which the position of the control lever in the car and the control attachment on the motor will not be changed with respect to the motor and the body despite relative movement between the motor and the car body.

It is a further object of this invention to provide a control arrangement which may be easily and cheaply installed in an automobile and which will be positive in its action.

Other objects and advantages of this invention will be apparent from a consideration of the following description and the attached drawings of which there are two sheets and in which Figure 1 represents a partially broken away side elevation of an automotive motor, frame and body showing my invention applied to these parts;

Figure 2 represents a plan view of my motor mount and control means and is taken along a plane indicated by the line 2—2 of Figure 1 and looking in the direction of the arrows;

Figure 3 represents a section taken along the line 3—3 of Figure 1 and looking in the direction of the arrows;

Figure 4 represents a section taken along the line 4—4 of Figure 2 and looking in the direction of the arrows;

Figure 5 represents a section taken along the line 5—5 of Figure 4 and looking in the direction of the arrows;

Figure 6 represents a section taken along the line 6—6 of Figure 2 and looking in the direction of the arrows;

Figure 7 represents a section taken along the line 7—7 of Figure 2 and looking in the direction of the arrows;

Figure 8 illustrates a method of attaching my control to a modified type of frame; and Figure 9 represents a section taken along the line 9—9 of Figure 8 and looking in the direction of the arrows.

In the drawings I have illustrated an automobile having a motor 10 supported upon a frame 12 which frame also supports a body, a portion of which is illustrated at 14. The motor is provided with a mounting assembly generally indicated at 16 for supporting the motor upon the frame. 18 indicates a steering column for operating the front wheels of the vehicle (not shown).

Attached to the rear end of the motor 10 by any suitable means known to the art today is the clutch housing 20 provided with the usual clutch operating shaft 22 which extends outside of the clutch housing and is provided with the lever 24 for rotating the shaft 22 to engage and disengage the clutch by means of any suitable clutch operating mechanism within the housing 20.

The body 14 is provided with a floor 26, dash 28, and toe board 30 through which projects the clutch pedal 32. The clutch pedal 32 may be supported from the floor board 26 by means of a pair of brackets 34 (see Figure 3) which are suitably fastened to the underside of the floor 26 and support a shaft 36 on which are journaled the levers 38 and 40 for operation by the clutch pedal 32 and brake pedal 42 respectively. The clutch lever 38 is provided with the crank arm 44 so that depressing the clutch pedal 32 will cause the arm 44 to be moved to the right as viewed in Figure 1.

Considering now my means for flexibly mounting the motor 10 on the frame 12, attention is called to Figures 2, 4, 6 and 7 in which I have shown a boss 48 located near the base of the motor 10. This boss 48 is drilled and tapped vertically at 50 to receive the conical-headed bolt 52 which holds one end of a leaf spring 54 to the motor 10 by engaging it in a conical aperture. The bottom of the boss 48 is provided with a plurality of horizontally extending bosses 56 which are drilled and tapped to receive the bolts 58 which hold a bracket 60 in spaced relation with the side of the motor 10. The bracket 60 is provided with a horizontal flange 62 in such a position that it supports the underside of the spring leaf 54. The spring leaf is fastened to the flange 62 by means of a strap 64 passed over the top of the spring 54 and fastened to the flange 62 by the bolts 66. It should be noted that this method of fastening the spring leaf 54 to the motor 10 gives a generally triangular shaped bearing arrangement between the bolts 66 and the bolt 52 and insures a solid connection between the spring and the motor.

The spring 54 is tapered in outline as it extends toward the frame 12. Frame 12 is provided with a mounting bracket which consists of a generally flat plate 70 on the upper side of which is formed the vertically extending oval flange 72. This flange 72 may be formed by stamping it out of the plate 70 or may be separately formed and later welded to the plate 70. The plate 70 is fastened to the frame 12 by means of bolts 74 in a manner which is more clearly illustrated in Figure 6. In Figure 7 I have shown the frame member 12 to be made up of two channel members 13 placed back to back and suitably secured as by welding. The plate 70 is secured to these channel members by means of through bolts 74 (see Figure 6) which are passed through holes punched in both the top and bottom flanges 15 of the inside channel member 13. I have provided the sleeves 76 around the through bolts 74 and between the flanges 15 to prevent the collapse of the flanges and to distribute the load to both flanges. If the motor mount 16 is to be applied to the frame 12 at a point where the frame is bent up as at 78 to form a kick-up over the front axle, plate 70 may be bent to conform to the contour of the frame 12.

Within the oval shaped flange 72 is positioned a plate 80 which may be formed by bending a strip of metal double upon itself. The opposite sides of the plate 80 are shaped outwardly near the center of the plate and form a central hole 82. The plate 80 is supported within the oval shaped flange 72 by means of the rubber or other flexible mounting 84 which is firmly fastened to the inside of the flange 72 and the surface of the plate 80. I have found that rubber vulcanized directly to the metal parts serves very well in this connection. It will be noted that the rubber curves upwardly from the inside of the flange 72 to the surface of the plate 80. This shape of the rubber causes downward movement of the plate 80, under the load on the spring 54, to put the rubber immediately under compression and shear. Since rubber is well adapted to take compressive and shearing loads, this type of mount easily supports the motor 10 while preventing transmission of vibration to the frame.

The top edges of the plate 80 are covered by bearing plate 86 on which rests the end of the spring leaf 54 held in place by the nut 88 threaded onto the bolt 89 which is welded or otherwise suitably secured in the hole 82.

From the above description of the motor mount, which is of course duplicated on each side of the motor, it should be apparent that the motor is allowed to oscillate slightly around its crank shaft by the flexible springs 54 which will cause a raising or lowering of one side of the motor with respect to the frame. It is also possible for the motor to move forward and backward to a slight extent due to thrust applied along the drive shaft and to rock longitudinally since the springs 54 are designed to be the only support for the motor 10, clutch housing 20 and the transmission and drive shaft (not shown).

With a motor mounted to rock and shift as just described, I have provided underneath the boss 48 a bracket 90 which is held to the motor 10 by means of the bolts 92 which also hold the oil pan 94 in place. Attached to the bracket 90 by means of rivets 96 is a strip 98 of relatively stiff non-elastic material such as a rubber and fabric composition, the other end of which is fastened to the flange 100 of a bar 102. The connection between the composition strip 98 and the flange 100 may also be made by rivets 96. It will be noted that the strip 98 extends the short distance to the rear of the bracket 90 and longitudinally along the side of the motor. This allows the composition to absorb any vibrations which might be transmitted to the bar 102.

The outer end of the bar 102 is tapered down to a small cross section as at 104 and passed through a hole 106 formed through the web of the channel members 13. On the outside of the channels 13 is provided a spring 108 retained around the end of the bar by means of a backing washer 110 and a pin 112 passed through the bar. Thus, as the bottom of the motor, which carries the bracket 90, oscillates to the right in Figure 7, the rod 102 slides in the hole 106 against the compression of spring 108 which maintains a relatively tight connection to prevent rattle.

Should the position of the bracket 90 be at a different level than the side frame member 12, the bar 102 may be bent as at 114 to provide a horizontal center portion and at the same time connects the tapered end 104 with the web members 13. Attached to the horizontal portion in the center of the bar 102 is a pin 116 held in place by some suitable means such as riveting over the end 118. Pin 116 serves to rotatably support the pulley 120 which may be held on the pin 116 by means of a pin 122 passed through pin 116. Pulley 120 is provided with a V-shaped groove and may be conveniently made by joining two stamped wheels having tapered flanges 121.

Around the pulley 120 is passed the control cable 124, one end of which is attached to the crank arm 44 and the other end to the clutch operating lever 24 on the clutch shaft 22. These connections may be made by passing the ends of the cable 124 through two yoke members 126, then soldering or otherwise suitably securing lugs 128 to the ends of the cable. The yoke members 126 then may be bent together and fastened to their respective levers by means of pins 130. It should be apparent that pressing down on the clutch pedal 32 will draw one end of the cable 124 to the rear, which motion is carried around the pulley 120 and results in the other end of the cable drawing the lever 24 forward and rotating the clutch shaft 22 to disengage the clutch.

The cable 124, which is the only continuous connection between the motor and the clutch pedal 32, is incapable of transmitting any vibration between the motor and the clutch pedal.

Special attention is called to the positioning of the clutch lever 24 and the crank arm 44 with respect to the pulley 120. The pulley is positioned midway between the motor and the frame and both the lever 24 and arm 44 are to the rear of the pulley. Should the motor move forwardly or backwardly relative to the frame for one unit distance, the lever 24 will move the same distance. Because bar 102 has one end fixed on the frame and because pulley 120 is located at the mid-point of the bar, the pulley will only move one-half unit. This movement decreases the distance between the pulley and lever 24 by one-half a unit tending to create slack in the cable 124. However, arm 44 is fixed relative to the frame and movement of the pulley increases the distance between the arm 44 and the pulley by one-half unit or just enough to keep the cable tight without moving either the arm 44 or the lever 24. It follows that the pulley will rotate to adjust the cable to its new position and the clutch and clutch pedal will not be effected by movement of the motor.

In Figures 8 and 9 I have illustrated how my invention may be applied to the car in which the side frame members are box shaped rather than I-beam shaped in cross section. In these figures the frame is made up of a channel member 140, the flanges of which are connected by a plate 142, thus forming a hollow box section. With this type of frame the bar 144 performs the same function as the bar 102 in the structure just disclosed. It is reduced at its outer end and provided with a hook portion 146. The plate 142 is slotted as at 148 which slot is large enough to pass the hooked end 146 of the par 144. The bar 144 is then retained against one edge of the slot 148 by means of a coil spring 150 which is hooked in holes in the plate 142 and the bar 144 with the hook portion 146 hooked within an opening in the plate 142. This type of connection is easily assembled and at the same time allows the bar 144 to slide relative to the side frame 12 while the spring 150 prevents the bar from falling out of the connection and also prevents it from rattling.

While I have described my invention in some detail, I do not intend this description to be limiting upon my invention and reserve the right to all structures falling within the attached claims.

I claim:

1. In an automobile having a frame, a motor, flexible means mounting said motor on said frame, a control lever on said motor, a control pedal on said frame, a bar yieldingly supported between said frame and said motor, a pulley carried on said bar and a cable passed around said pulley and attached to said control lever and said control pedal.

2. In an automobile having a frame, a motor mounted to oscillate relative to said frame, a control lever on said motor, a bar yieldingly mounted between said frame and said motor and in a plane of oscillation of said motor, a control pedal carried on said frame, a pulley carried on said bar and a cable passed around said pulley and attached to said control lever and said control pedal.

3. In an automobile having a body, an engine having a projection on each side and near the longitudinal center thereof, a spring leaf fastened to each of said projections, brackets having rubber mounted plates therein fixed to said body, means for fastening said spring leaves to said plates, a bar of flexible material fastened to said motor under one of said spring leaves, a second bar fastened to said first bar and extending under said leaf spring and parallel thereto, a flange on said body defining an aperture arranged to receive the end of said second bar, spring means between the outer end of said second bar and said flange for yieldingly retaining said second bar, a pulley on said second bar, a control lever on said engine, a control lever on said body and a cable between said levers and extending around said pulley.

4. In an automobile having a frame, a motor mounted for limited oscillation relative to said frame, a control lever on said motor, a bar loosely passed through said frame, means including vibration dampening material supporting one end of said bar from said motor, said bar being movable along its axis through said frame, a pulley carried on said bar, a control pedal on said frame and a cable connecting said control lever and said control pedal and passed around said pulley.

5. In an automobile having a frame, a motor mounted for limited oscillation relative to said frame, a control lever on said motor, a bar loosely passed through said frame, means supporting one end of said bar from said motor, said bar being movable along its axis through said frame, a pulley carried on said bar, a control pedal on said frame and a cable connecting said control lever and said control pedal and passed around said pulley.

6. In an automobile having a flexibly mounted motor, a clutch mechanism in said motor, a clutch pedal, means connecting said clutch mechanism and said clutch pedal including a cable and a pulley, said pulley being mounted for movement relative to said motor and said pedal.

7. In an automobile having a flexibly mounted motor, a bracket fastened to said motor, a strip of relatively rigid but inelastic material fastened to said bracket, a bar supported at one end by said strip of inelastic material, the other end of said bar being slidingly supported from the frame of said car, a pulley supported on the center of said bar, a clutch operating lever on said motor, a clutch pedal carried on the frame of said car, and a cable connecting said clutch lever and said clutch pedal and passed around said pulley.

8. In combination with an automobile having a frame with a motor flexibly mounted thereon, a cable for controlling said motor from said frame, a pulley for directing said cable, a bar for supporting said pulley, said bar being slidingly supported at one end and a strip of inelastic material for supporting the other end of said bar, said bar being supported between said frame and said motor.

9. In an automobile, a frame, a motor, a clutch lever on said motor, a spring leaf fastened to said motor, a bracket bolted to said frame, said bracket having an oval shaped flange, a bolt retaining plate within said oval shaped flange, rubber material holding said bolt retaining plate within said oval flange, said spring on said motor being supported upon said bolt retaining plate, a bar retaining plate, a bar yieldingly supported between said motor and said frame underneath said spring, a pulley on said bar, a clutch pedal on said frame and a cable connecting said clutch pedal and said clutch lever and passed around said pulley.

10. In an automobile, a frame having hollow side members, a motor, spring means for supporting said motor on said frame, a portion of said frame defining a slot underneath said spring means, a bar supported at one end by said means, a bar supported at one end by said motor and having a hooked end passed through said slot, spring means engaging said hook with a side of said slot, a pulley mounted on said bar and a control cable extending from said motor to said frame and extending around said pulley.

NILS ERIK WAHLBERG.